July 21, 1925.

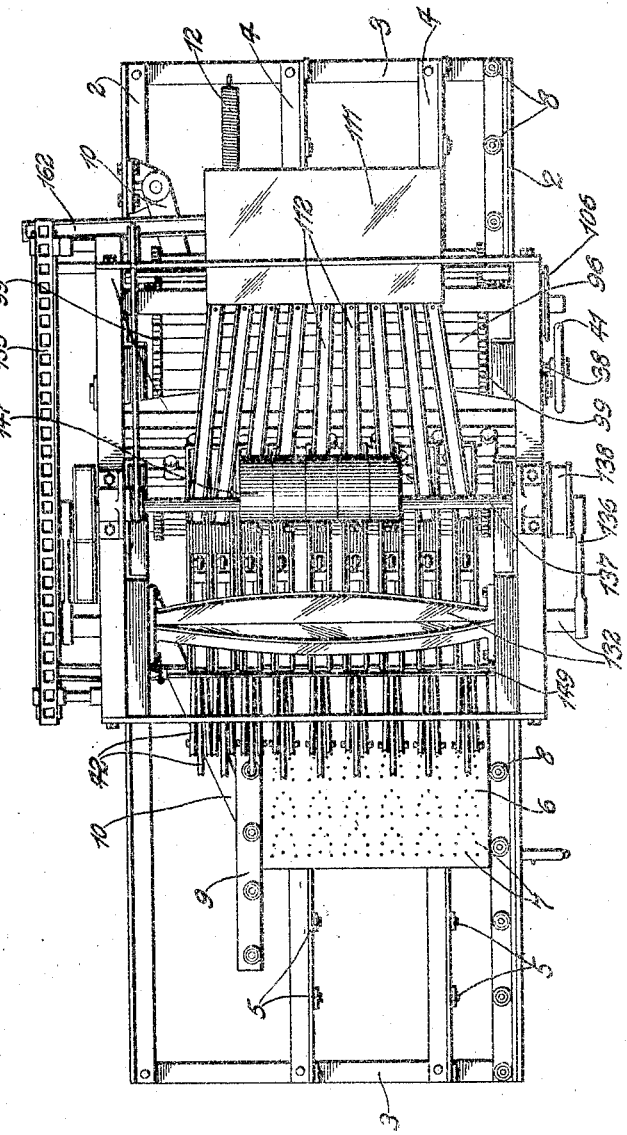

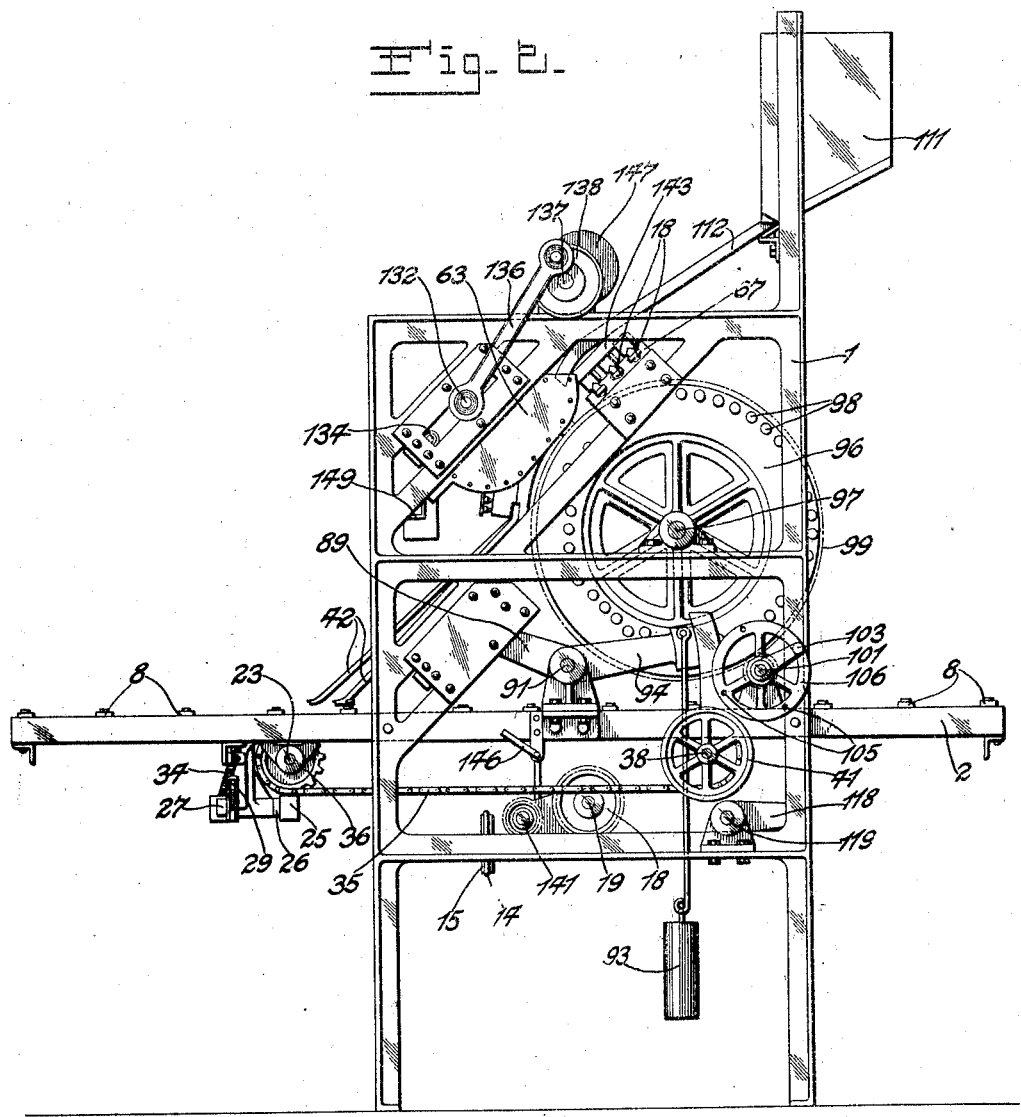

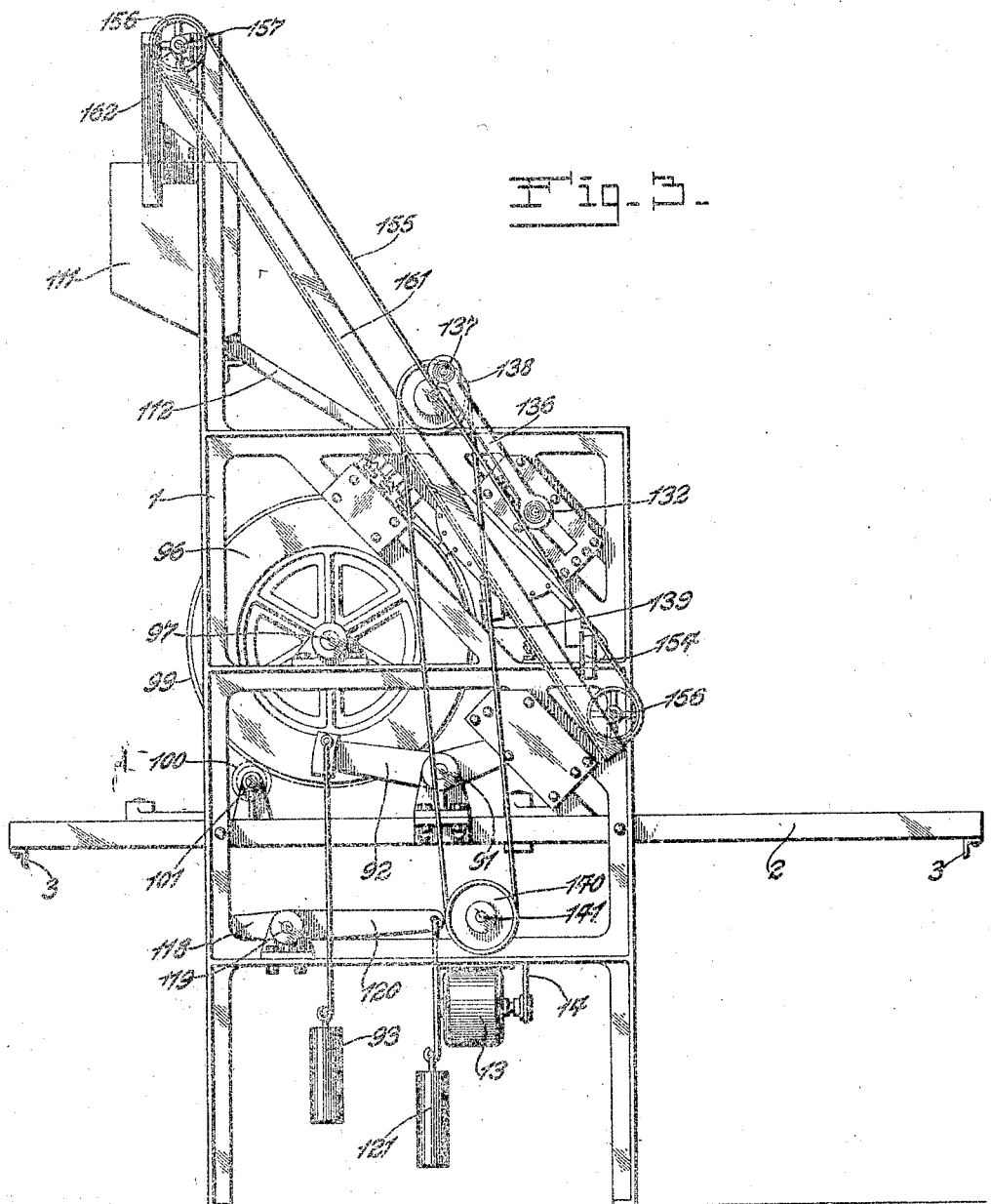

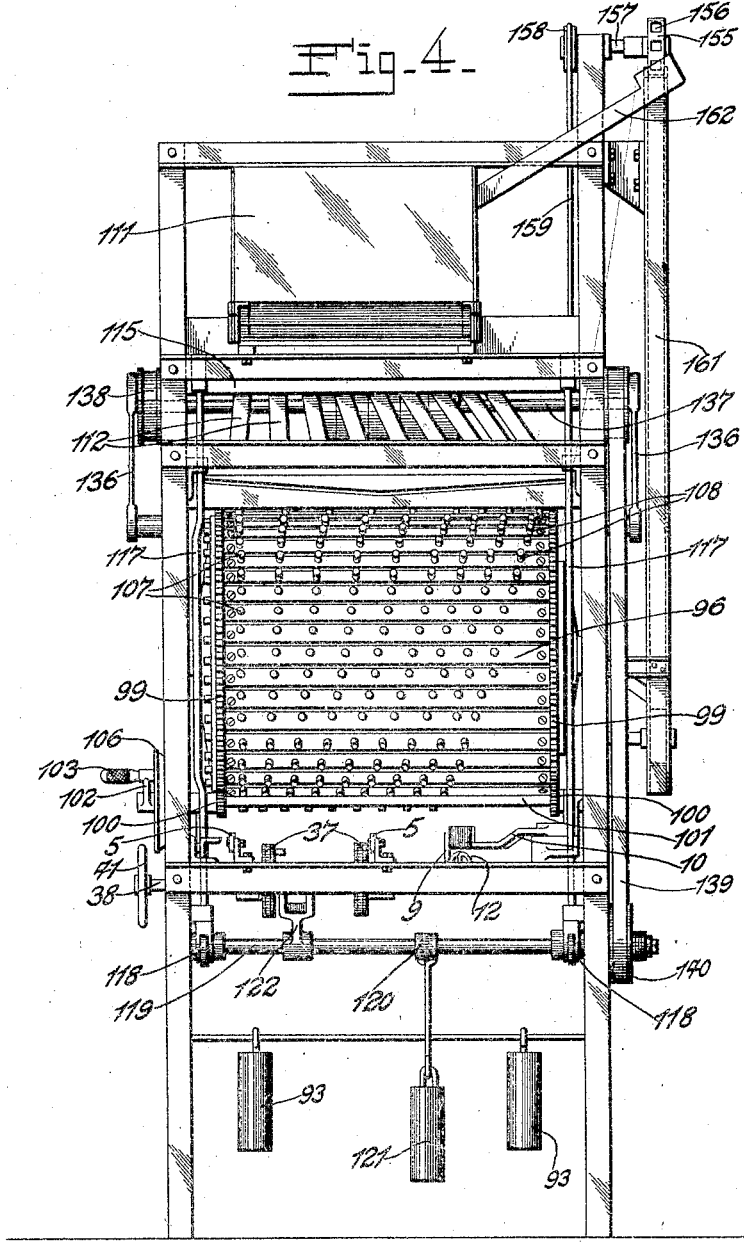

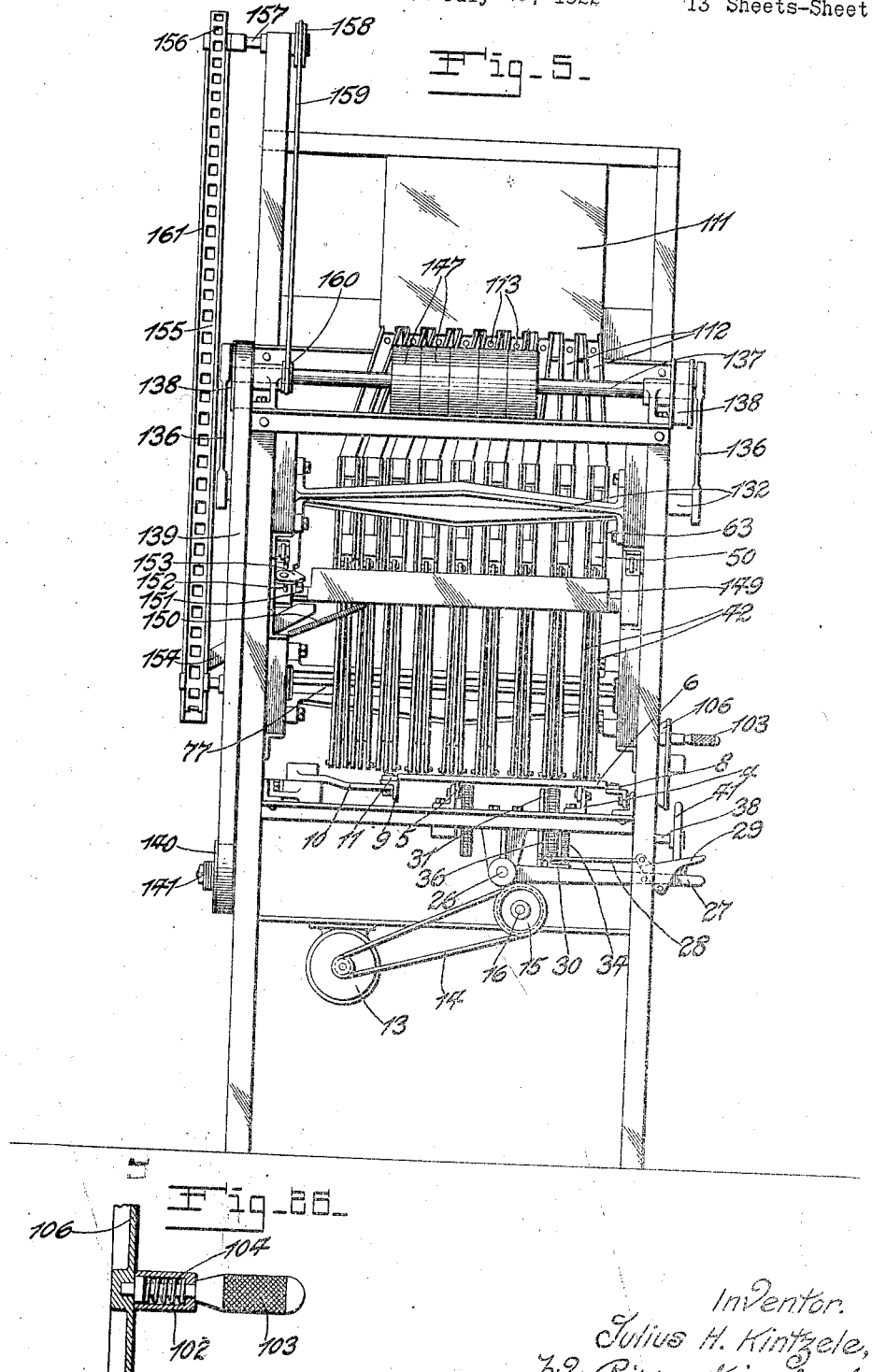

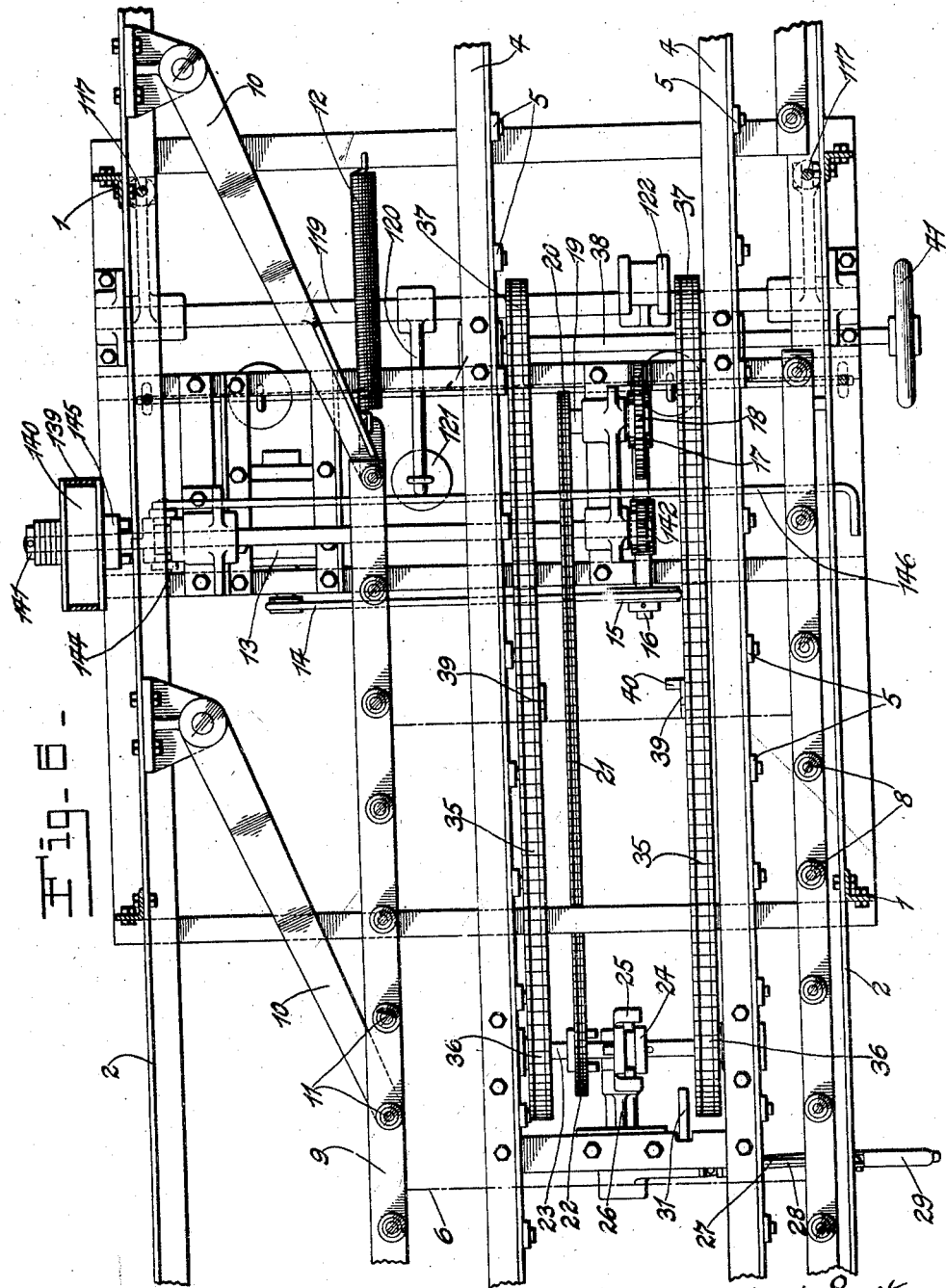

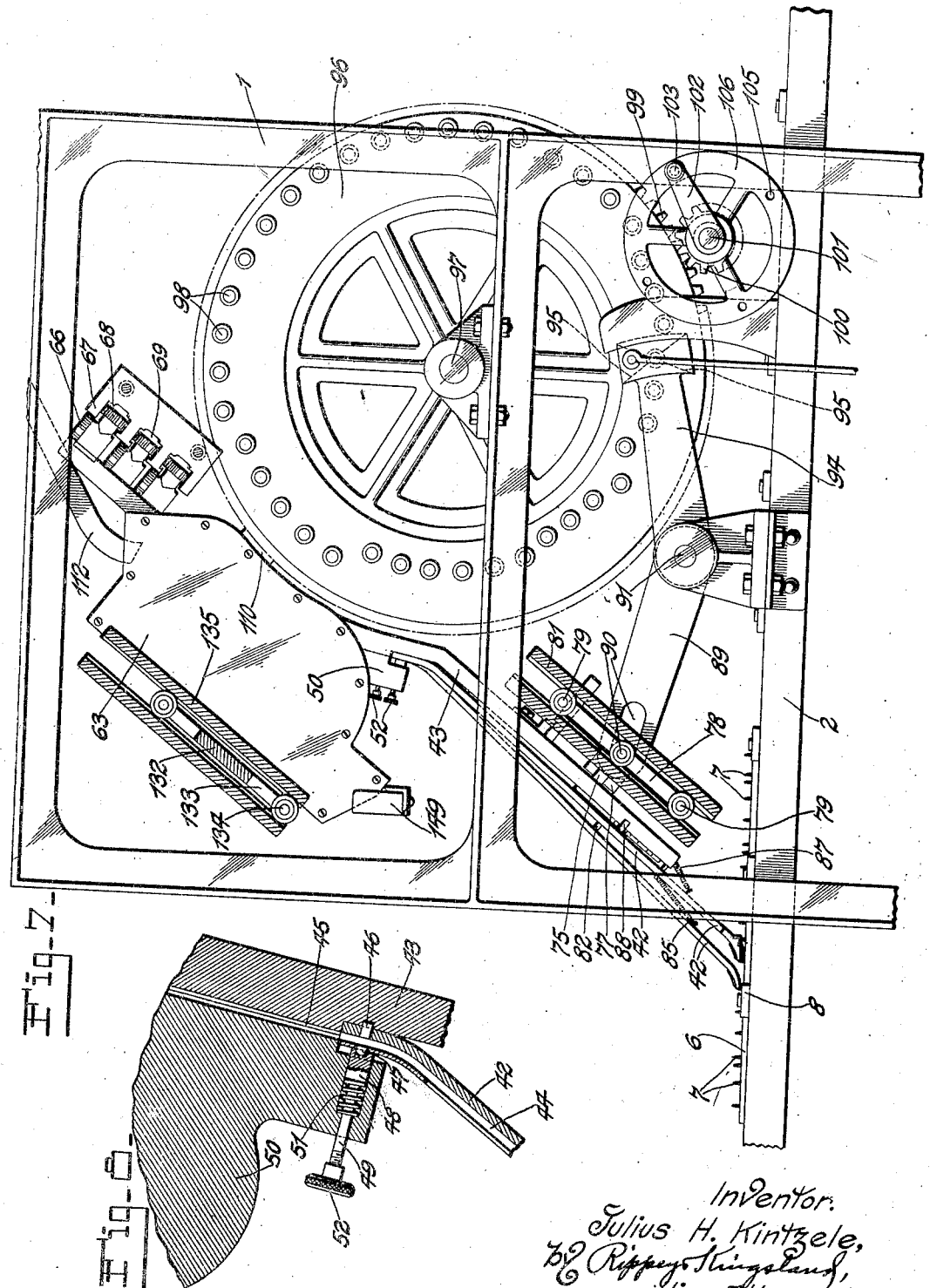

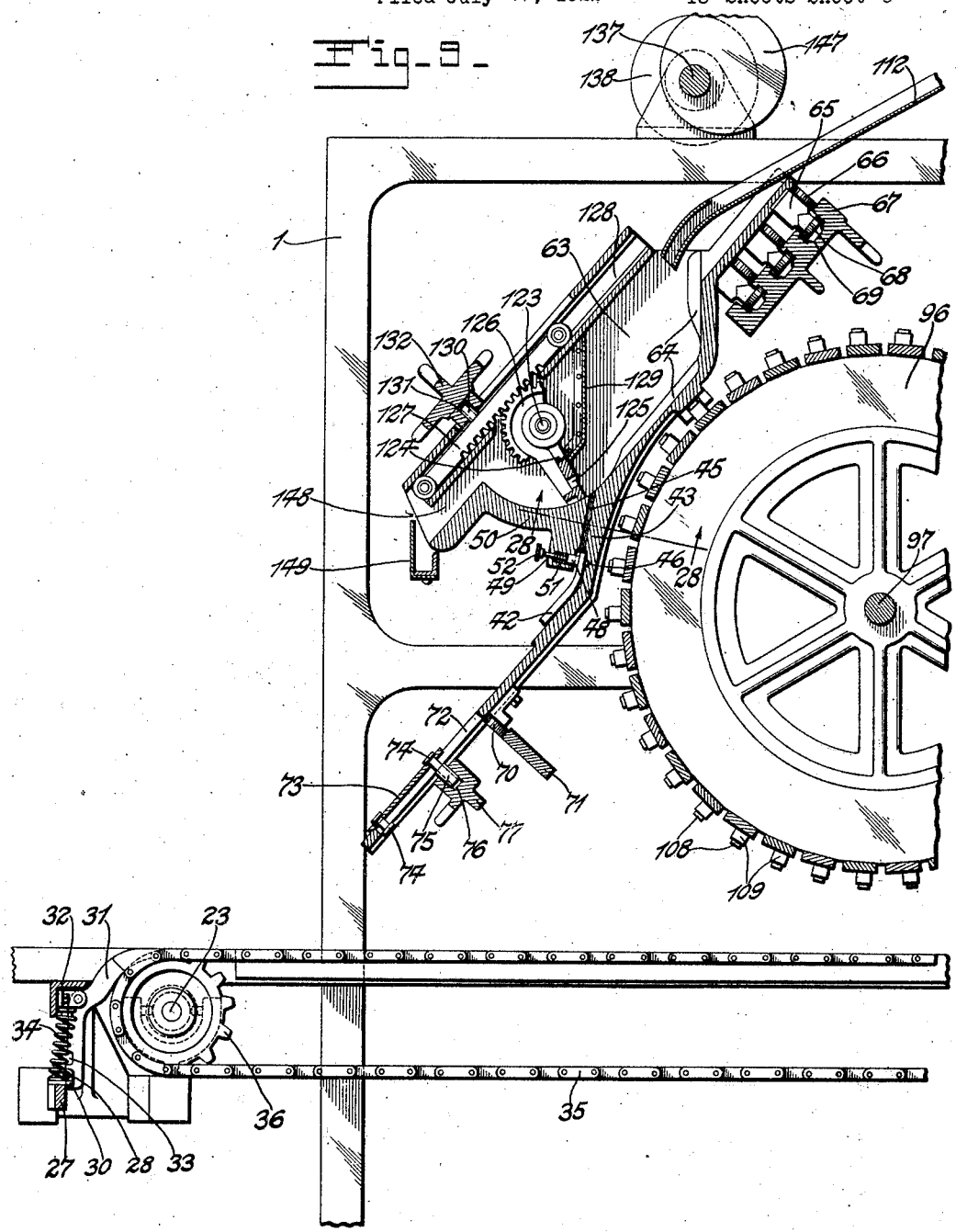

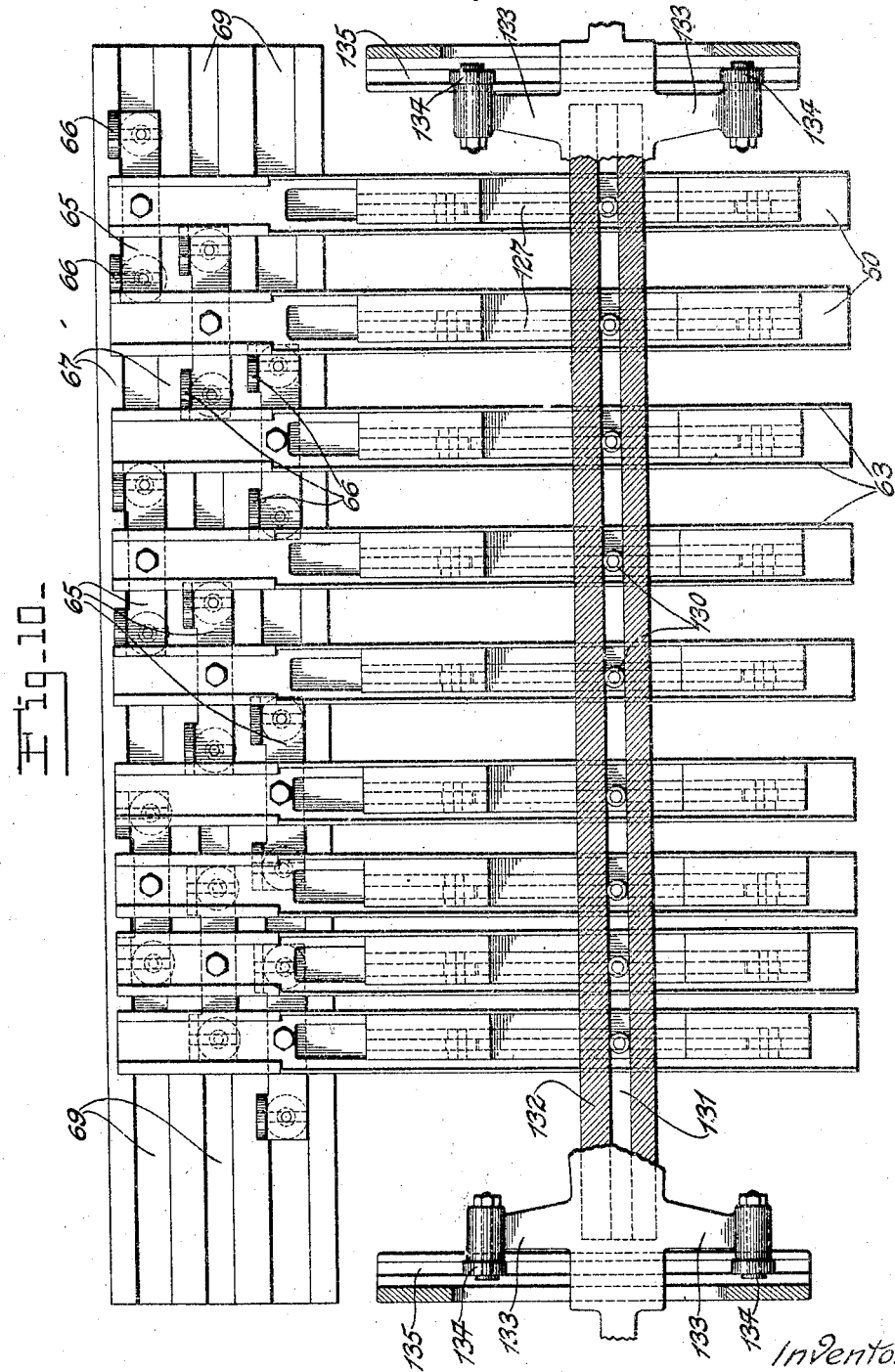

J. H. KINTZELE

WASHER PLACING MACHINE FOR RUBBER HEEL MOLDS

Filed July 29, 1922   13 Sheets-Sheet 10

1,546,904

Inventor.
Julius H. Kintzele,
His Attorneys.

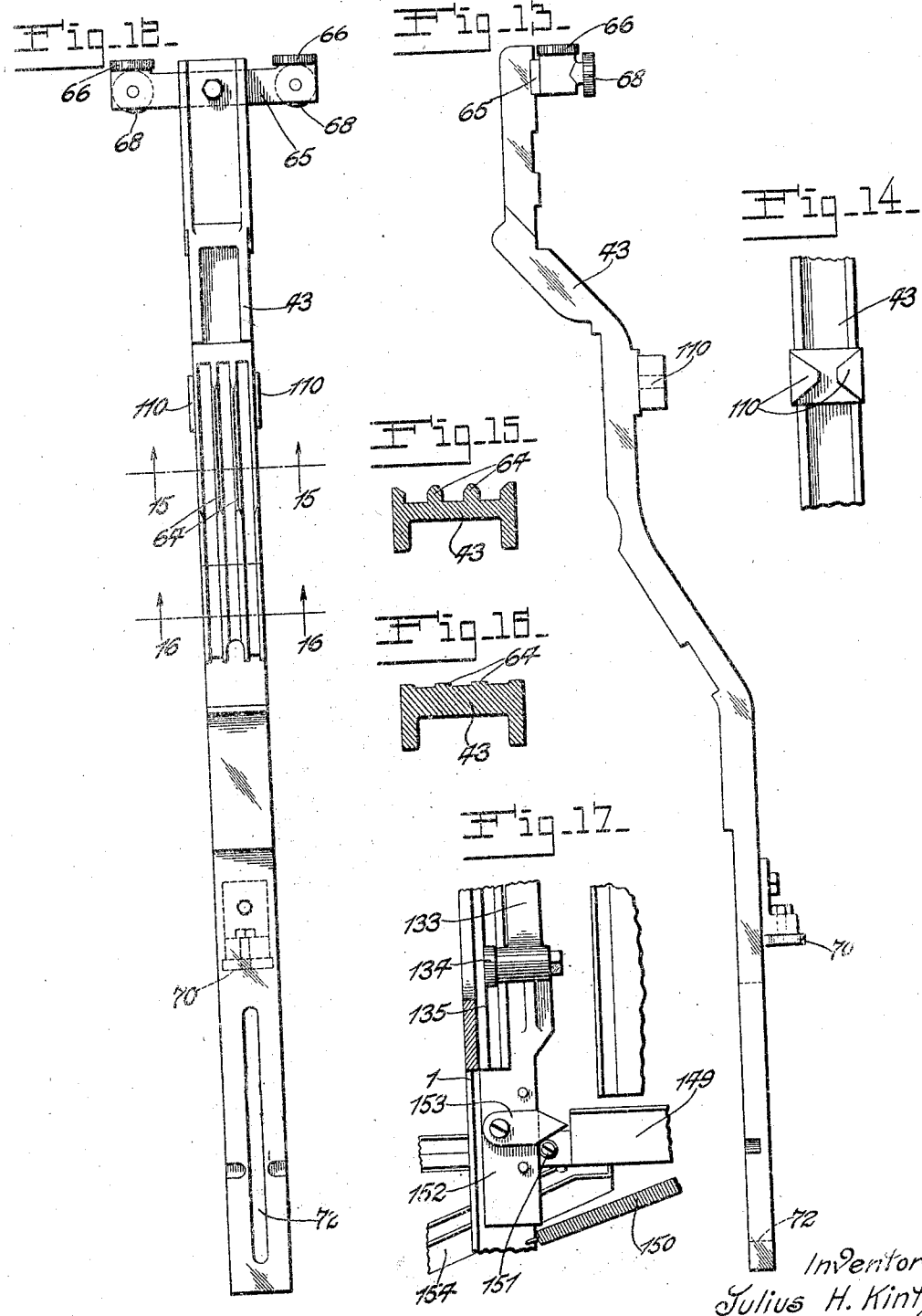

July 21, 1925.
J. H. KINTZELE
WASHER PLACING MACHINE FOR RUBBER HEEL MOLDS
Filed July 29, 1922
1,546,904
13 Sheets-Sheet 12
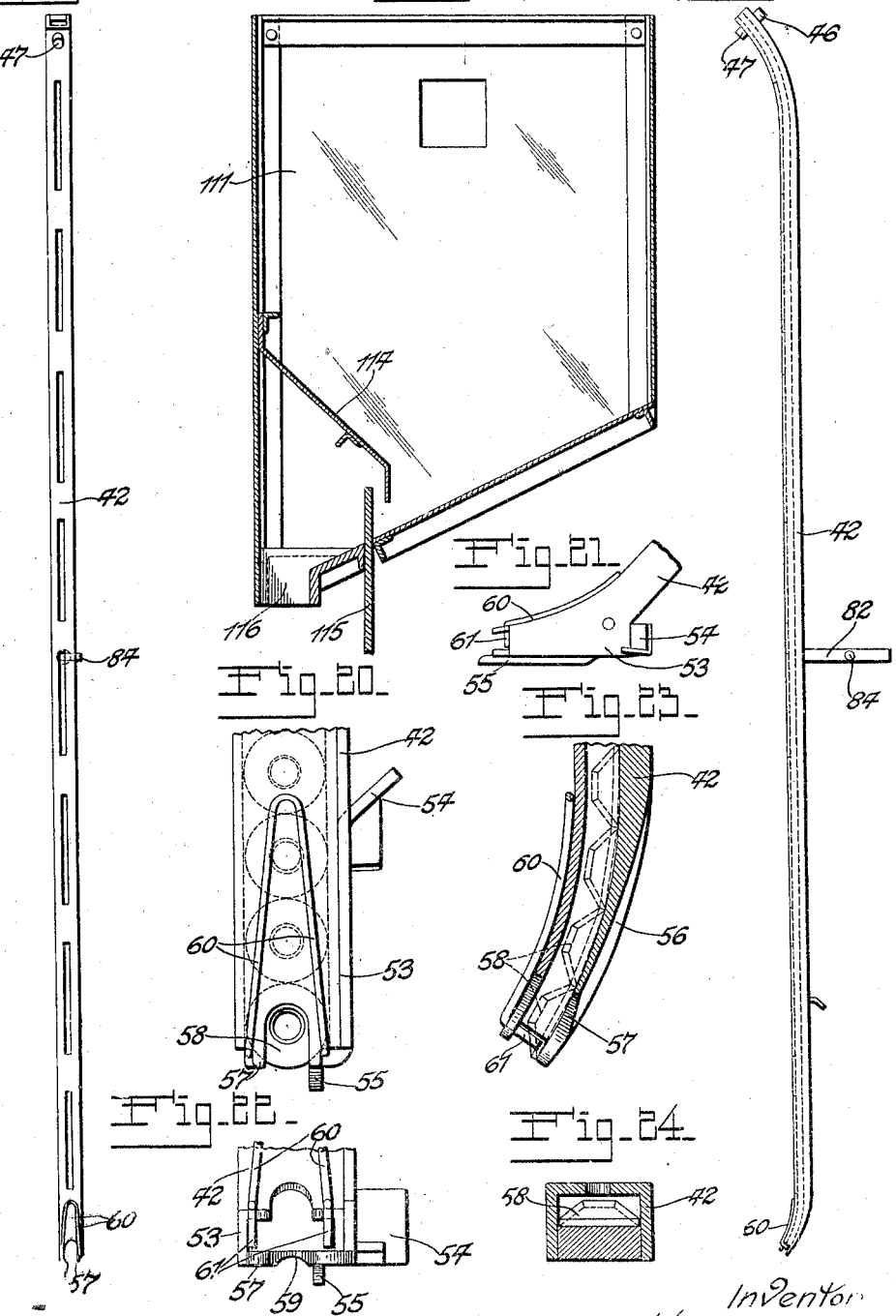

July 21, 1925.
J. H. KINTZELE
1,546,904
WASHER PLACING MACHINE FOR RUBBER HEEL MOLDS
Filed July 29, 1922  13 Sheets-Sheet 13
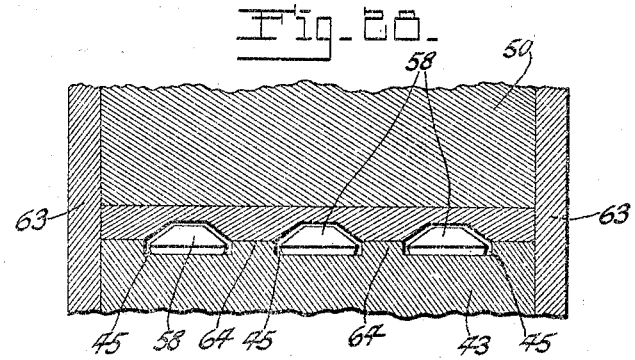
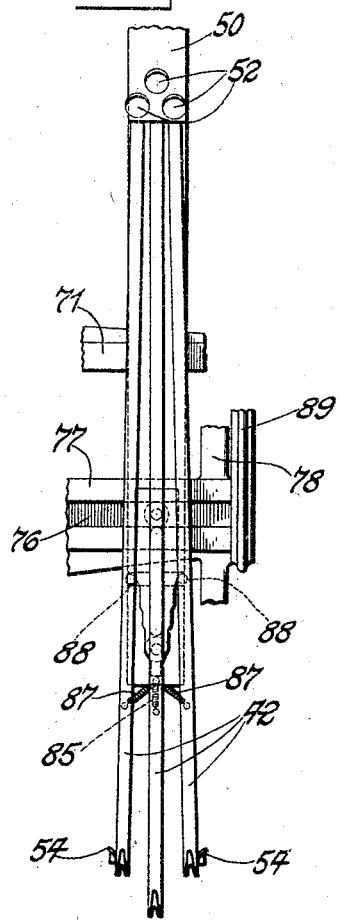
Inventor.
Julius H. Kintzele,
by Rippey Kingsland
His Attorneys Patented July 21, 1925.

1,546,904

UNITED STATES PATENT OFFICE.

JULIUS H. KINTZELE, OF ST. LOUIS, MISSOURI.

WASHER-PLACING MACHINE FOR RUBBER-HEEL MOLDS.

Application filed July 29, 1922. Serial No. 578,482.

*To all whom it may concern:*

Be it known that I, JULIUS H. KINTZELE, a citizen of the United States, residing in the city of St. Louis and State of Missouri, have invented a new and useful Washer-Placing Machine for Rubber-Heel Molds, of which the following is a specification.

This invention relates to machines for placing washers upon the pins of rubber heel molds.

An object of the invention is to provide a machine capable of adjustment and operation to place washers simultaneously upon a number of rows of pins in a rubber heel mold.

Another object of the invention is to provide such a machine capable of such adjustment and operation and capable of further adjustment and operation to place washers upon the pins of molds for making heels of different sizes.

Another object of the invention is to provide improved mechanism for effecting proper relative movement so that as an incident to the operation of the machine the washers will be engaged and retained by the pins.

Another object of the invention is to provide a machine embodying novel and efficient construction and mechanism whereby the washer placing fingers that deliver the washers to the pins oscillate to operate upon pins in zigzag rows.

Another object of the invention is to provide a machine of the character and for the purposes stated in which the washer placing fingers may be adjusted as required to operate upon the pins in large or small molds, as desired.

Various other objects will appear from the following description, reference being made to the drawings, in which Fig. 1 is a plan view of my improved machine.

Fig. 2 is an end elevation.

Fig. 3 is a view showing the opposite end of the machine.

Fig. 4 is a rear side elevation of the machine.

Fig. 5 is a front side elevation of the machine.

Fig. 6 is a plan view of the operating mechanism of the machine.

Fig. 7 is a view showing a part of the mechanism for adjusting the washer delivering fingers for operation upon pins in molds of different sizes.

Fig. 8 is an enlarged sectional view showing the manner in which the washer delivering fingers are pivotally supported.

Fig. 9 is a sectional view through one of the hoppers from which the washers are delivered to the washer delivering fingers, the cylinder for moving the washer delivering mechanism laterally being also shown in section.

Fig. 10 is a view of the supports for the washer delivering fingers, said supports being capable of lateral adjustment to cause the washer delivering fingers to operate upon pins in molds of different sizes.

Fig. 12 is a plan view of one of the supports for the washer delivering fingers.

Fig. 13 is a side elevation of a support.

Fig. 14 is a view showing one of the cam devices forming part of the adjusting mechanism for the supports.

Fig. 15 is a cross sectional view on the line 15—15 of Fig. 12.

Fig. 16 is a cross sectional view on the line 16—16 of Fig. 12.

Fig. 17 is a view showing a part of the mechanism for oscillating a discharge device by which overflow or lost washers are discharged from the machine.

Fig. 18 is a plan view of one of the washer delivering fingers.

Fig. 19 is a side elevation of the finger.

Fig. 20 is an enlarged plan view of the discharge end of one of the washer delivering fingers.

Fig. 21 is a side elevation thereof.

Fig. 22 is an end elevation thereof.

Fig. 23 is a longitudinal sectional view of the end portion of one of the washer delivering fingers.

Fig. 24 is a cross sectional view of one of the washer delivering fingers.

Fig. 25 (Sheet 2) is a view showing a part of the operating mechanism of the machine.

Fig. 26 (Sheet 5) is a detailed sectional view of the device for adjusting and holding the drum forming part of the mechanism for adjusting the washer delivering fingers.

Fig. 27 is a sectional view of the large hopper which contains the washers that are delivered to the various service hoppers that serve the series of washer delivering fingers.

Fig. 28 is a sectional view showing the form of the passages leading from the hoppers to the washer delivering fingers.

Fig. 29 is a view showing the washer delivering fingers spread apart to deliver washers to pins in large molds.

Figure 11:
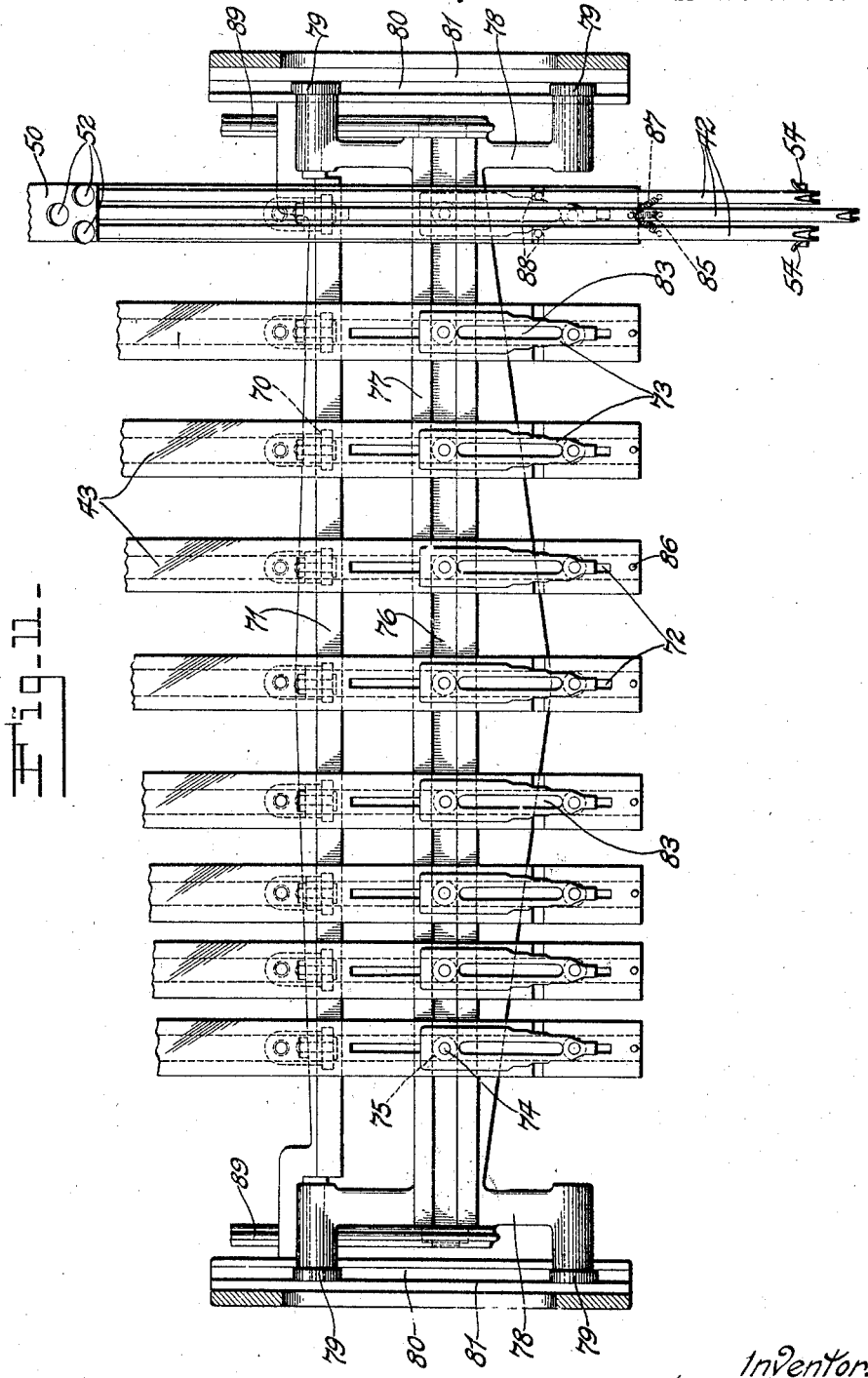
Fig. 11 is a view showing a part of the mechanism by which the washer delivering fingers are adjusted relatively for service upon molds of different dimensions.

The machine comprises supporting frames 1 in which a horizontal frame, comprising side members 2 and end members 3, is mounted. The horizontal frame supports a number of longitudinal bars 4 carrying rollers 5 operating on horizontal axes for supporting the heel molds 6 as the latter are passed through the machine to have washers placed on the mold pins 7 (Fig. 1). The mold pins are generally in zigzag rows, since a number of heel molds are served by each mold plate. One of the side members 2 of the horizontal frame supports a row of rollers 8 operating on vertical axes serving as a guide for one of the side edges of the mold plate passing through the machine. The guide for the other side edge of the mold plate comprises a bar 9 (Figs. 1 and 6) to which the inner ends of levers 10 are pivoted, the outer ends of said levers being pivoted to stationary parts of the frame. The bar 9 supports a row of rollers 11 on vertical axes. A spring 12 is connected with the bar 9 and with the stationary part of the frame in such a way as to actuate the bar 9 toward the row of rollers 8. By this construction the machine will accommodate molds of different widths, the molds being held against a row of rollers 8 by the pressure applied to the opposite side edge of the mold by the rollers 11.

The molds are moved through the machine and the washers are placed on the pins automatically and as an incident to the operation of the machine. The washer placing devices by which the washers are delivered to and placed upon the pins places washers upon all the pins in the mold at one operation, so that it is unnecessary to pass the mold through the machine more than once to have washers placed on all of the pins of the mold. This is true irrespective of the size of the mold and irrespective of the size of the heels and the number of heels in the molds. For instance, in the case of small heels the rows of pins are closer together than they are in molds for making larger heels. The washer placing devices are adjustable to place the washers upon all of the pins of the mold irrespective of the varying sizes of the molds passed through the machine.

Looking at Figs. 1 and 6 the molds are passed through the machine from the rear toward the front, that is from the right hand side of Figs. 1 and 6, toward the left hand side thereof.

A motor 13 operates a belt 14 passing around a pulley 15 on a shaft 16. The shaft 16 has a worm 17 (Fig. 25) meshing with a gear 18 on a shaft 19. A sprocket wheel 20 on the shaft 19 is engaged by a sprocket chain 21 which also engages a sprocket wheel 22 loose upon a shaft 23 (Fig. 6) and engageable by a clutch 24 on said shaft. An arm 25 carried by a rocking rod 26 (Fig. 5) is operable to shift the clutch member 24 into and out of engagement with the sprocket wheel 22. A lever 27 is connected with the rod 26 and constitutes means for operating the clutch. By raising the outer end of the lever 27 the clutch 24 will be moved into engagement with the sprocket wheel 22. A latch device is provided for holding the lever 27 in its raised position, the same comprising a rod 28 having its outer end pivoted to a lever 29 on the lever 27 and its inner end operating within a guide 30 on said lever 27. A latch member 31 is pivoted to a support 32 (Fig. 9) and has a notch 33 into which the inner end of the rod 28 will engage when the lever 27 is raised in opposition to the power of the spring 34 which is exerted to press the lever 27 downwardly. Obviously when the rod 28 is engaged within the notch 33 the clutch member 24 will be retained in engagement with the sprocket wheel 22.

A pair of sprocket chains 35 (Figs. 6 and 9) engage sprocket wheels 36 rigid on the shaft 23 and a sprocket wheel 37 rigid on a shaft 38. Therefore the sprocket chains 35 are operated when the clutch member 24 engages the sprocket wheel 22. Each of the chains 35 has an arm 39 attached thereto. The arms 39 extend upwardly a sufficient distance to engage the rear side edge of a mold 6 when the mold is placed in the machine upon the rollers 5 in position to be engaged by said arms 39. The mold is thereby moved along relative to the washer placing devices which deliver washers to the pins 7. The arm 39 on one of the chains 35 has a lateral projection 40 (Fig. 6) which is arranged to contact with the lower edge of the upper portion of the latch 31 (Fig. 9) at about the time the mold passes beyond the washer placing devices and after washers have been placed upon all of the pins 7 in the mold. The latch 31 is thereby moved a sufficient distance to permit the rod 30 to pass out of the notch 33 in the latch 31, permitting the spring 34 to operate the lever 27 and thereby move the clutch member 24 out of engagement with the sprocket wheel 22. This permits the chains 35 to stop until the clutch member 24 is again engaged with the sprocket wheel 22, giving sufficient time to start another mold into the machine. The shaft 38 is equipped with a hand wheel 41 by which said shaft may be turned manually to operate the chains 35 when said manual operation is needed.

The washer placing devices comprise fingers 42 the formation and the construction of which are best shown in Figs. 18 to 24, and the mounting of which is best shown in Figs. 7, 8 and 11. There is one set of such fingers for each row of heel molds and one finger for each row of pins. The fingers are pivotally supported in inclined positions. The fingers are pivoted upon supports 43 in position so that the passages 44 through the fingers register at their upper ends with passages 45 communicating with the washer delivering hoppers. The upper end of each finger 42 has on its lower side a pivoted projection 46 engaging in the support 43 and on its upper side a projection 47 engaging with a movable element 48 on the inner end of a rod 49 mounted for axial movements in supports 50. Expansion springs 51 are arranged within the supports 50 to press the elements 48 against the fingers 42 to support said fingers in proper position and to permit oscillation of the fingers as required to place washers upon zigzag rows of pins in the heel molds. Each of the rods 49 is equipped with a hand hold 52 whereby the retaining devices 48 may be disengaged from the pins 47 to permit individual removal and replacement of the washer placing fingers 42.

Usually three fingers are sufficient to serve each row of molds because the pins in each row of molds are usually in three rows; that is, there is a middle row of pins and two zigzag side rows of pins for each row of molds (Fig. 1). This makes it necessary for the two side fingers of each series of three fingers to oscillate as the mold moves through the machine to permit the side fingers to apply washers to the zigzag rows of pins. The lower end of one of the side fingers is shown in Fig. 21, while the lower end of one of the middle fingers is shown in Fig. 23. The lower end of each side finger has a flat portion 53 with a lateral extension 54 and a depending flange 55 to bear upon the mold plate 6. The lateral extension 54 by its contact with the mold pins serves to pull the finger 42 outwardly and also to oscillate said finger on zigzag rows of pins. The lower end of the middle finger of each series has a groove or channel 56 (Fig. 23) opening into a bifurcated extremity 57 of the finger through which the pins may pass to engage the washers 58. The under sides of the lower portions 53 of the side fingers are similarly grooved as shown at 59 (Fig. 22). Spring arms 60 are provided upon the lower end of each finger having downward extensions 61 against which the washers contact when they reach the lower ends of the fingers. The arms 60 are capable of outward movement and are pressed apart by the washers 58 when the pins engage the washers during the movement of the mold. That is, as the mold moves along the pins 7 pass through the bifurcations at the ends of the fingers 42 and engage in the holes in the washers and draw the washers out of the fingers. After a washer 58 is drawn out the arms 60 spring back to proper position to catch and hold next following washers until the washers are engaged by the pins successively.

The supports 43 constitute the bottom walls of hoppers one of which is provided for each series of washer delivering fingers 42, there being three of such fingers in each series as stated. The supports 50 form the lower ends of said hoppers (Fig. 9), the passages 45 being formed between the supports 43 and 50 for conducting washers from the hoppers into the passages through said fingers 42. Plates 63 form the side walls of the hoppers.

The supports 43 are of angular formation (Figs. 7, 9 and 13) having ribs 64 on their upper sides within the hoppers for guiding the washers to the passages 45. The upper end of each of the supports 43 has a transverse member 65 attached thereto (Figs. 10, 12 and 13), each of said transverse members supporting a pair of rollers 66 operating upon a track 67 and a pair of rollers 68 mounted on axes at right angles to the axes of the rollers 66 and engaging in grooves 69 in the track member 67. The rollers 68 hold the washer delivering mechanism upon the tracks, while the rollers 66 facilitate lateral movements of the washer delivering mechanism. A roller 70 in connection with each lower portion of each of the supporting members 42 operates upon a track 71.

The lower portion of each of the supports 43 is provided with a slot 72. A cam plate 73 is mounted on the lower portion of each support 43 and has pins 74 extending through the slot 72 of the support 43 on which it is mounted. One of the pins 74 in connection with each cam plate 73 has a roller 75 (Figs. 9 and 11) extending into a groove 76 in a transverse bar 77 having arms 78 on its ends. The arms 78 at each end of the bar 77 has a pair of rollers 79. The rollers 79 operate in grooves 80 in inclined track members 81. Obviously movement of the bar 77 upon the inclined tracks on which it is mounted will move the cam plates 73.

The middle finger 42 of each series of three fingers has a pin 82 (Figs. 7 and 19) extending through a slot 83 in the subjacent cam plate 73. The pin 82 has a lateral extension 84 bearing upon the cam plate 73 and limiting the downward movement of the middle finger which is actuated downwardly by a spring 85 (Fig. 7) connecting the middle finger with a pin 86 on the support 43. The two side fingers 42 of each series are likewise actuated downwardly by springs 87. The springs 87 also draw the side fingers 42 toward each other and toward the middle finger 42 (Fig. 11) causing the pins 88 on the side fingers to press against the side edges of the cam plate 73. When the bar 77 is moved downwardly the cam plates 73 are likewise moved downwardly, pressing the side fingers 42 of each series apart to proper position to operate upon rows of pins in molds passing through the machine. In this way the fingers 42 of each series of fingers can be spaced properly to serve washers to pins in rows that are close together, or that are spaced different distances apart.

A pair of levers 89 having pin-in-slot connection 90 with the ends of the bar 77 are attached to a rock shaft 91 (Figs. 2, 3 and 7). An arm 92 (Fig. 3) attached to one end of the shaft 91 supports a weight 93 which tends to raise the arms 89 and thereby the bar 77. The opposite end of the shaft 91 has an arm 94 having a head provided with two conical cams 95, the pointed ends of which are toward each other but are spaced apart. A drum 96 is mounted on an axial members 97 in the frame of the machine. One end of the drum 96 supports a series of rollers 98 arranged to contact with the inclined sides of the cams 95 to oscillate the arm 94 and thereby operate the levers 89 to raise and to lower the bar 77 the position of which, as stated, determines the positions of the fingers 42 of each series of fingers relatively. The rollers 98 are arranged at various distances from the axis of the drum so that the finger spacing mechanism will be operated automatically and as an incident to the turning of the drum. The rollers 98 are arranged so close together that when one of the rollers is leaving the space between the cams 95 the next adjacent roller is in position to engage the inclined surface of one of the cams.

It will be seen that when the end of the arm 94 is depressed by the rollers 98 closest to the periphery of the drum 96 the cam plates 73 are raised placing the narrow portions of the cam plates between the pins 88 and permitting the springs 87 to draw the fingers 42 at the sides toward the middle fingers 42 to place washers upon pins in molds for making small heels; and that when the arm 94 is raised by the rollers 98 closest to the axis of the drum 96 the cam plates 73 are pushed downwardly to place wider portions of the cam plates between the pins 88 and thereby press the side fingers 42 laterally away from the middle fingers 42 in opposition to the springs 87. The drum 96 is arranged for rotation, for which purpose the drum is provided with one or more gear wheels 99 meshing with pinions 100 on a shaft 101 (Figs. 2, 3, 4 and 7). One end of the shaft 101 is equipped with a crank 102, the handle 103 of which is actuated inwardly by a spring 104 (Fig. 26—Sheet 5) to engage in holes 105 in a rigid member 106. By turning the crank 102 from one position to another and latching the crank in its adjusted positions by engaging the stem of the crank in the holes 105, the drum 96 may be held in different adjusted positions as desired to vary the space between the fingers 42 in order to cause the fingers 42 to deliver washers to rows of pins in molds for making heels of different sizes. Lateral oscillation of the side fingers 42 as required to serve washers to pins in zigzag rows is permitted in any of the adjusted positions of the fingers.

When the machine is used to place washers in molds for making small heels it is desirable that the different rows of fingers be close together since the rows of heel molds are close together; and when the machine is used for placing washers upon the pins in molds for making large heels it is desirable to spread the series of fingers apart as well as to spread the fingers of each series apart. Spacing of the series of fingers is also controlled by the drum 96 automatically and as an incident to the rotation of said drum to space the fingers of each series apart as above described. That is, when the side fingers 42 of the different series of fingers are spread away from the middle fingers 42 of the series, the supports 43 are spread or moved apart by operation of the drum 96; and when the drum 96 is operated to permit the side fingers 42 to retract toward the middle fingers 42 the supports 43 are moved closer together. These movements are synchronized and are effected automatically as an incident to the operation of the drum 96 without any special attention by the operator. The devices for moving the supports 43 toward and away from each other as required to adjust the machine for molds of different sizes will now be described.

The drum 96 near one end has a circumferential series of radially projecting pins or teeth 107 (Fig. 4) which cooperate with the first one of the supports 43; and between the circumferential row of pins 107 and the opposite end of the drum is provided with numerous spiral rows of pins 108 similar to the pins 107, one of which rows of pins cooperates with one of the supports 43. If desired the pins 107 and 108 may be equipped with rollers 109 (Fig. 9). Each of the supports 43 has a pair of conical cams 110 (Figs. 13 and 14) with which the rollers 109 on the teeth 107 and 108 cooperate. Obviously by turning the drum 96 the spiral rows of pins 108 by engagement with the cams 110 will move the supports 43 laterally toward or away from each other. The rollers 109 pass through the space between the cams 110 and by contacting with the inclined edges of the cams effect the lateral movements of the supports 43 as stated. During such lateral movement the rollers 66, 68 and 70 support and retain the supports 43 in proper relationship.

The arrangement of the pins 108 with respect to the rollers 98 is such that the supports 43 are moved away from each other properly whenever the side fingers 42 are spread away from the middle fingers 42; and whenever the side fingers 42 are permitted to retract toward the middle fingers 42 the supports 43 are moved toward each other. These movements are synchronized so that the parts are moved to their proper positions automatically and as an incident to the rotation of the drum 96.

A large hopper 111 at the top of the machine is arranged to contain a quantity of washers. Chutes 112 have their upper ends held by pivots 113 in position to receive washers discharged thereto from the hopper 111. The lower ends of the pivoted chutes 112 extend into the respective hoppers 43—50 so as to swing laterally as said hoppers 43—50 are moved laterally and to discharge washers into said hoppers 43—50 in any of the laterally adjusted positions thereof. The hopper 111 has an inclined baffle wall 114 (Fig. 27) to restrict and partially control the discharge of washers therefrom. A movable gate 115 extends through the inclined bottom wall of the hopper 111 between the lower end of the baffle 114 and the discharge openings 116 from the hopper, which openings are above the upper ends of the pivoted chutes 112. The gate 115 is raised and lowered to discharge washers intermittently from the hopper 111 when the machine is in operation. The gate 115 is connected to the upper ends of rods 117 (Fig. 4), and the lower ends of said rods are pivoted to rearwardly extending arms 118 on a rock shaft 119. A forwardly extending arm 120 (Figs. 3, 4 and 6) on the rock shaft 119 supports a weight 121 which serves to hold the gate 115 in its upward position to prevent discharge of washers from the hopper 111. The shaft 119 has an upwardly extending arm 122 against which the projection 40 (Fig. 6) on one of the chains 35 rubs during movement of the chain, with the result that the shaft 119 is turned in opposition to the weight 121 in a direction to lower the gate 115 and permit washers to pass from the hopper 111 into the various pivoted chutes 112 and thence to the washer delivering fingers.

A shaft 123 (Fig. 9) is mounted in each of the hoppers 43—50. Each of the shafts 123 supports a gate 124 extending about the full width of the hopper and having an opening 125 near its lower end. The side edges of each of the gates are near the side walls 63 of the hopper in which the gate is mounted and the lower edge of the gate is near the curved inner wall of the bottom hopper. The gates are movable to and from position in which they extend upwardly from points in front of or below the openings from the hoppers into the passages 45. The gates serve to agitate or stir the washers in the hoppers to cause washers to assume proper positions to enter the passages 45. The passages 45 are constructed with wide lower portions to receive the wide parts of the washers and with converging upper walls. This requires the washers to enter the passages properly, as shown in Fig. 28. The washers sliding toward the passages 45 in the hoppers in the wrong position to enter the passages 45 will pass over the passages and not enter them. Each of the gates 124 has a gear segment 126 in connection with it. The segments 126 mesh with racks 127 operating in guides 128 supported by the hoppers. Obviously movement of the racks will swing the gates to cause the washers to enter the passages 45 and to cause excess numbers of the washers to escape through the openings 125. The washers are held toward the bottom of the hoppers by plates 129 supported within the hoppers. Each of the racks 127 has a projection 130 extending upwardly into a groove 131 in a bar 132. The bar 132 has arms 133 on its ends equipped with rollers 134 operating in guides 135. As a result of this construction it is obvious that proper movement of the bar 132 will operate the racks 127 and oscillate the gates 124. The ends of the bar 132 have links 136 pivoted thereto (Figs. 2 and 3) the upper ends of which are eccentrically connected with a shaft 137. As shown, the eccentric connection between the upper ends of the links 136 and the shaft 137 includes wheels 138 on the shaft with eccentric pivot connections between said wheels and the links 136, and the form of the connection may be varied as desired.

A belt 139 from one of the wheels 138 engages a pulley 140 loose on a shaft 141. The shaft 141 has a pinion 142 attached to its inner end meshing with a worm 143 on the shaft 16 (Fig. 6). A clutch member 144 on the shaft 141 is movable into and out of engagement with a clutch member 145 rigid with the pulley 140. A rod 146 is provided for operating the clutch member 144 into and out of clutching engagement with the clutch member 145. By this mechanism the devices for stirring or agitating the washers in the hoppers can be operated or not, as desired, when the machine is running.

A number of counterweights 148 are secured on the shaft 137 to govern the operation thereof.

As stated the surplus or excess washers are discharged from the hoppers 43—50 through the gates 124, said washers leaving the hoppers through discharge openings 148 (Fig. 9) into a trough or chute 149 supported transversely of the machine in position to receive the discharged washers. The chute 149 is supported by the frame 1 of the machine for lateral sliding movements and is actuated in one direction by a spring 150 (Figs. 5 and 17), one end of which is connected to said chute 149 and the other end of which is connected to a stationary part of the machine.

A roller 151 on the chute 149 contacts with an extension 152 of the adjacent arm 133 that is in connection with the transverse bar 132. A detent cam 153 on the extension 152 rubs against the roller 151 as the bar 132 and the extension 152 thereof move, with the result that the chute 149 is oscillated causing the washers therein to move toward the discharge end of said chute. The discharge end of the chute 149 opens above an inclined chute 154 into which the washers are received when they are discharged from the chute 149. From the chute 154 the washers are discharged onto an endless conveyor 155 in the form of a belt or chain having openings therethrough of sufficient size to permit the washers to pass through them. The conveyor is mounted on pulleys 156, the upper end of which is on a shaft 157. A pulley 158 (Figs. 4 and 5) on the shaft 157 is engaged by a belt 159 which also engages a pulley 160 on the shaft 137. Consequently the conveyor 155 is operated whenever the shaft 137 is rotated. The conveyor 155 operates in a chute 161 whereby the washers discharged onto the conveyor are guided upwardly until they are discharged into a chute 162 opening into the hopper 111. Thus, the surplus or excess washers discharged from the hoppers 43—50 are returned to the hopper 111 for subsequent use.

From the foregoing it will be seen that my invention is a thoroughly complete machine embodying mechanism for controlling the discharge of washers from a large receptacle or hopper 111 to the several adjustable hoppers 43—50. From the respective hoppers 43—50 the washers pass to the different series of washer delivering fingers 42 by which the washers are guided to position for engagement by the pins 7 of the heel molds. The series of fingers 42 may be moved to different relative adjustments to serve molds for making heels of different sizes and the fingers of each series may also be adjusted relatively for that purpose. The machine is easily controlled and operated and, for the amount of work which it performs, comprises comparatively few parts. In operation the machine is highly efficient and greatly reduces the expense and labor that has heretofore been necessary in the manufacture of rubber heels. Obviously, the construction and arrangement of the parts may be widely varied without departure from the nature and principle of the invention. Likewise, the capacity of the machine may be altered to serve molds of different sizes without changing the nature and principle of the invention. I do not restrict myself unessentially in any particular, but what I claim and desire to secure by Letters Patent is:—

1. A machine of the character described, comprising a series of fingers having passages for conducting washers to position for engagement by pins to which the washers are to be applied, springs actuating certain of said fingers toward each other and permitting oscillation of said fingers on zigzag rows of pins, mechanism for delivering the washers into said passages, and mechanism for causing the pins to engage washers delivered thereto by said fingers and to withdraw the washers from the fingers.

2. A machine of the character described comprising a series of passages for conducting washers to position for engagement by pins to which the washers are to be applied, a device for actuating said passages to the different laterally adjusted positions and for holding said passages in such adjusted positions, and means for operating said device.

3. A machine of the character described comprising a series of passages for conducting washers to position for engagement by pins to which the washers are to be applied, a device for actuating said passages to different relative adjusted positions to deliver washers to pins in rows different distances apart, manual means for operating said device, and mechanism for causing the pins to engage washers in said passages and to withdraw the washers from said passages.

4. A machine of the character described comprising series of fingers having passages therethrough for conducting washers to position for engagement by pins to which the washers are to be applied, a rotary drum, devices in connection with said drum for moving said fingers to different relative adjustments for service, and means for rotating said drum.

5. A machine of the character described, comprising a support for a rubber heel mold containing pins, a series of three fingers for delivering washers to three rows of pins simultaneously, means for supporting said fingers and permitting lateral oscillation thereof in delivering washers to zigzag rows of pins, a spring for actuating the middle finger of the series downwardly, springs for actuating the two side fingers of the series downwardly and toward the middle finger, and mechanism for moving the mold to cause the pins in the mold to engage washers delivered thereto by said fingers.

6. A machine of the character described comprising a series of pivoted fingers having passages for conducting washers to position for engagement by pins to which the washers are to be applied, an actuating and holding device, means for operating said actuating and holding device, and means in connection with said actuating and holding device for adjusting and holding the fingers different distances apart.

7. A machine of the character described, comprising a middle finger for delivering washers to a row of pins, a finger at each side of the middle finger for delivering washers to rows of pins at the sides of the row of pins to which the middle finger places washers, springs for drawing the side fingers toward the middle fingers, and mechanism for delivering the washers to said fingers.

8. A machine of the character described comprising a middle finger for delivering washers to a row of pins, a finger at each side of the middle finger for delivering washers to rows of pins at the sides of the row of pins to which the middle finger delivers washers, an actuating and holding device for moving said side fingers to different spaced adjustments with respect to said middle finger, means for operating said device, and means for delivering washers to said fingers in any of their adjustments.

9. A machine of the character described, comprising a support for a rubber heel mold containing pins, mechanism for moving the mold, adjustable spring actuated means for guiding the mold, and mechanism for delivering washers to the pins during movement of the mold.

10. A machine of the character described, comprising a support for a rubber heel mold containing pins, mechanism for moving the mold, a yielding spring actuated guide for the mold, and series of fingers for delivering washers to the pins during movement of the mold.

11. A machine of the character described, comprising a support for a rubber heel mold containing rows of pins, mechanism for moving the mold, mechanism for placing washers on the pins during movement of the mold, and means controlled by said moving mechanism for causing said moving mechanism to stop after the washers have been placed on the pins.

12. A machine of the character described, comprising a series of fingers having passages therethrough for conducting washers to position for engagement by pins to which the washers are to be applied, mechanism for delivering washers into the passages in said fingers, devices for varying the relative position of said fingers, and means for operating said devices.

13. A machine of the character described, comprising series of fingers having passages therethrough for conducting washers to positions for engagement by the pins to which the washers are to be applied, and mechanism for varying the relative positions of the fingers of each series and also varying the relative positions of the different series of fingers as required to serve washers to pins in rows different distances apart.

14. A machine of the character described, comprising a series of pivoted fingers having passages for conducting washers to position for engagement by pins to which the washers are to be applied, springs actuating certain of said fingers toward each other and permitting oscillation of said fingers in operating on zigzag rows of pins, and mechanism for causing the fingers to deliver washers to pins in a number of rows of pins at the same time.

15. A machine of the character described comprising mechanism for moving in one direction a rubber heel mold containing pins, a series of pivoted fingers for applying washers upon a number of rows of pins in the mold during the continuous movement of the mold in the direction aforesaid, and springs for actuating the fingers at the sides of said series toward each other and permitting oscillation of said side fingers in operating on zigzag rows of pins.

16. A machine of the character described, comprising a middle finger for delivering washers to a row of pins, a finger pivotally supported at each side of the middle finger for delivering washers to rows of pins at the sides of the row of pins to which the middle finger places washers, means for actuating the side fingers toward the middle finger, and means for moving the side fingers away from the middle finger.

17. A machine of the character described, comprising a series of fingers for delivering washers at the same time to a number of rows of pins, springs for holding said fingers in proper position for service, and a spacing device for spreading the fingers apart in positions to serve different rows of pins.

18. A machine of the character described, comprising a series of fingers for delivering washers to all of the pins in a row of rubber heel molds, devices for spreading the fingers apart, springs actuating the fingers toward each other, and mechanism for operating the molds in one direction to engage the washers delivered thereto by said fingers.

19. A machine of the character described, comprising a pivoted middle finger for delivering washers to a row of pins, a spring yieldingly holding said finger in position for service, two fingers pivoted one at each side of the middle finger, springs for actuating the side fingers toward the middle finger and permitting the side fingers to oscillate in placing washers upon pins in zigzag rows, and means for moving the side fingers outwardly to different adjusted positions relative to the middle finger.

20. A machine of the character described, comprising a pivoted middle finger for delivering washers to a row of pins, a spring yieldingly holding said finger in position for service, two fingers pivoted one at each side of the middle finger, springs for actuating the side fingers toward the middle finger and permitting the side fingers to oscillate in placing washers upon pins in zigzag rows, means for moving the side fingers outwardly to different adjusted positions relative to the middle finger, and means for moving all of said fingers laterally as a series.

21. A machine of the character described, comprising series of fingers and each series including a middle finger and two side fingers and each finger having a passage therethrough, springs actuating the side fingers toward the middle fingers, mechanism for delivering washers into said passages, and mechanism for moving the series of fingers toward or away from each other to different positions for service.

22. A machine of the character described, comprising series of fingers and each series including a middle finger and two side fingers and each finger having a passage therethrough, mechanism for delivering washers into said passages, mechanism for moving the series of fingers toward or away from each other to different positions for service, and means for adjusting the fingers of each series in different relative positions for service.

23. A machine of the character described, comprising series of fingers for delivering washers to the pins in rows of rubber heel molds, mechanism for delivering washers to said fingers, a rotary drum, mechanism for rotating said drum, and means operated by said drum for moving the series of fingers toward or away from each other.

24. A machine of the character described, comprising series of fingers for delivering washers to the pins in rows of rubber heel molds, mechanism for delivering washers to said fingers, a rotary drum, mechanism for rotating said drum, means operated by said drum for moving the series of fingers toward or away from each other, and means controlled by said drum for moving the fingers of each series toward or away from each other.

25. A machine of the character described, comprising a receptacle for washers, chutes for receiving the washers discharged thereto from the receptacle, a gate controlling the discharge of washers from the receptacle into the chutes, means for moving said gate to and from position to permit discharge of washers from said receptacle, hoppers arranged to receive the washers from the chutes, and a series of washer delivering fingers communicating with each of said hoppers.

26. A machine of the character described, comprising a receptacle for washers, chutes for receiving the washers discharged thereto from the receptacle, means controlling the discharge of washers from the receptacle into the chutes, hoppers arranged to receive the washers from the chutes, a series of washer delivering fingers communicating with each of said hoppers, and mechanism for moving the series of fingers to different adjusted positions.

27. A machine of the character described, comprising a receptacle for washers, chutes for receiving the washers discharged thereto from the receptacle, means controlling the discharge of washers from the receptacle into the chutes, hoppers arranged to receive the washers from the chutes, a series of washers delivering fingers communicating with each of said hoppers, and means for moving the fingers of each series to different adjusted positions.

28. A machine of the character described, comprising a receptacle for washers, chutes for receiving washers discharged thereto from the receptacle, a gate controlling the discharge of washers from the receptacle, series of pivoted fingers having passages therethrough for guiding washers to position for engagement by pins to which the washers are to be applied, and means for conducting the washers from the chutes into said passages.

29. A machine of the character described, comprising a series of hoppers, mechanism for delivering washers into said hoppers, a series of pivoted fingers having passages therethrough arranged to receive washers from said hoppers to conduct the washers to position for engagement by pins to which the washers are to be applied, means for moving the fingers toward and away from each other, and means for retaining the washers in the passages in said fingers until the washers are engaged by the pins to which they are to be applied.

30. A machine of the character described, comprising hoppers arranged to contain washers, a series of fingers having passages for receiving the washers from the hoppers, mechanism for causing the washers to enter said passages, means for moving the fingers toward and away from each other, and mechanism for operating a rubber heel mold having pins to cause the pins of the mold to engage the washers and withdraw them from the passages in the fingers.

31. A machine of the character described, comprising a hopper arranged to contain washers, a series of fingers for conducting the washers from the hopper to position for engagement by pins to which the washers are to be applied, and means for moving the fingers to, and holding the fingers in, different positions as required to conduct washers to pins in rows different distances apart.

32. In a machine of the character described, mechanism for moving in one direction a rubber heel mold containing pins, fingers for conducting washers to position for engagement by the pins during movement of the mold, and a device for causing said mechanism to stop after washers have been placed upon the pins in the mold.

33. In a machine of the character described, mechanism for moving in one direction a rubber heel mold containing pins, fingers for conducting washers to position for engagement by the pins during movement of the mold, a device for causing said mechanism to stop after washers have been placed upon the pins in the mold, and connections controlling the operation of said mechanism.

34. A machine of the character described, comprising mechanism for moving in one direction a rubber heel mold containing pins, a device controlling the operation of said mechanism, means operated by said mechanism to cause said device to prevent said mechanism from operating after washers have been placed upon the pins in the mold, and a series of pivoted fingers for delivering washers to the pins in the mold.

35. In a machine of the character described, the combination with washer placing mechanism for conducting washers to position for engagement by pins in a mold to which the washers are to be applied, actuating mechanism for operating the mold to engage the pins delivered thereto by said first-named mechanism, means for operating said actuating mechanism, and means for guiding the mold during movement thereof by said operating mechanism.

36. In a machine of the character described, the combination of series of fingers having passages for conducting washers to positions for engagement by pins in a moving mold to which the washers are to be applied, mechanism for delivering washers into said passages, means for adjusting the fingers properly to deliver washers to the pins in the moving mold, actuating mechanism for moving the mold to cause the pins therein to engage the washers, and means for operating said actuating mechanism.

37. In a machine of the character described, the combination of a support, means for holding molds containing pins, means for operating pin carrying molds of different widths, series of fingers having passages for conducting washers to position for engagement by the pins in the mold, springs for holding the fingers in proper positions for the washers to be engaged by the pins, hoppers for delivering washers to the fingers, a chute for receiving overflow washers from the hoppers, and means for returning the overflow washers into the hoppers.

38. In a machine of the character described, the combination of a support, means for holding molds containing pins, means for operating pin carrying molds of different widths, series of fingers having passages for conducting washers to position for engagement by the pins in the mold, springs for holding the fingers in proper positions for the washers to be engaged by the pins, hoppers for delivering washers to the fingers, a chute for receiving overflow washers from the hoppers, and mechanism for causing the washers to be discharged from said chute.

39. A machine of the character described, comprising a series of fingers having passages for conducting washers to position for engagement by pins to which the washers are to be applied, a hopper for delivering washers to said fingers, means for discharging surplus numbers of washers from said hopper, a chute for receiving the surplus washers discharged from said hopper, and means for causing the washers to be discharged from said chute.

40. A machine of the character described, comprising a series of fingers having passages for conducting washers to position for engagement by pins to which the washers are to be applied, a hopper for delivering washers to said fingers, means for discharging surplus numbers of washers from said hopper, a chute for receiving the surplus washers discharged from said hopper, means for causing the washers to be discharged from said chute, and mechanism for returning the surplus washers discharged from said chute to said hopper.

41. A machine of the character described, comprising a series of passages for conducting washers to position for engagement by the pins to which the washers are to be applied, mechanism for moving the passages to and holding the passages in different relative adjustments to deliver washers to pins in rows different distances apart, a hopper arranged to contain washers, and means for causing the washers to pass from said hopper into said passages in any of the relative adjustments of said passages.

42. A machine of the character described, comprising a series of passages for conducting washers to position for engagement by the pins to which the washers are to be applied, mechanism for holding the passages in different relative adjustments to deliver washers to pins in rows different distances apart, a hopper arranged to contain washers, means for causing the washers to pass from said hopper into said passages in any of the relative adjustments of said passages, means for discharging surplus washers from said hopper, and a chute for receiving the surplus washers discharged from said hopper.

43. A machine of the character described, comprising a series of passages for conducting washers to position for engagement by the pins to which the washers are to be applied, mechanism for holding the passages in different relative adjustments to deliver washers to pins in rows different distances apart, a hopper arranged to contain washers, means for causing the washers to pass from said hopper into said passages in any of the relative adjustments of said passages, means for discharging surplus washers from said hopper, a chute for receiving the surplus washers discharged from said hopper, and mechanism for returning the surplus washers into said hopper.

44. A machine of the character described, comprising a series of passages for conducting washers to position for engagement by pins to which the washers are to be applied, mechanism for holding the passages in different relative adjustments to deliver washers to pins in rows different distances apart, a hopper arranged to contain washers and having passages therefrom for conducting washers to said first-named passages in any of the adjustments of said first-named passages, means for discharging surplus washers from said hopper, and mechanism for causing the pins to engage washers in the first-named passages and to withdraw the washers from said passages.

45. A machine of the character described, comprising a series of passages for conducting washers to position for engagement by pins to which the washers are to be applied, mechanism for holding the passages in different relative adjustments to deliver washers to pins in rows different distances apart, a hopper arranged to contain washers and having passages therefrom for conducting washers to said first-named passages in any of the adjustments of said first-named passages, means for discharging surplus washers from said hopper, mechanism for causing the pins to engage washers in the first-named passages and to withdraw the washers from said passages, and mechanism for returning the surplus washers to said hopper.

46. A machine of the character described, comprising series of fingers having passages therethrough for conducting washers to position for engagement by pins to which the washers are to be applied, releasable pivot devices supporting said fingers, mechanism for moving the series of fingers to different operative positions, mechanism for delivering washers into the passages in said fingers, and mechanism for causing pins to engage washers in said passages and to withdraw the washers from said passages.

47. A machine of the character described, comprising series of fingers having passages therethrough for conducting washers to position for engagement by pins to which the washers are to be applied, releasable pivot devices supporting said fingers, mechanism for delivering washers into the passages in said fingers, mechanism for causing pins to engage washers in said passages and to withdraw the washers from said passages, and mechanism for moving the fingers to and holding the fingers in different relative adjustments for service.

48. A machine of the character described, comprising a support for a rubber heel mold containing pins, series of fingers having passages therethrough for conducting washers to position for engagement by the pins on the mold, mechanism for causing washers to enter the passages in said fingers, means for holding said fingers in different spaced relationship, and actuating mechanism for moving the mold to cause the pins in the mold to engage washers delivered thereto by said fingers.

49. A machine of the character described, comprising a support for a rubber heel mold containing pins, series of fingers having passages therethrough for conducting washers to position for engagement by the pins on the mold, mechanism for causing washers to enter the passages in said fingers, means for holding said fingers in different spaced relationship, actuating mechanism for moving the mold to cause the pins in the mold to engage washers delivered thereto by said fingers, and means controlling the operation of said mechanism to cause said mechanism to operate intermittently.

50. A machine of the character described, comprising a series of pivoted fingers having passages for conducting washers to position for engagement by pins to which the washers are to be applied, means for delivering washers into a number of said passages at the same time, an element for actuating said fingers away from each other, springs for drawing said fingers toward each other, and mechanism for causing the fingers to deliver washers to pins in a number of rows of pins at the same time.

51. A machine of the character described, comprising a middle finger for delivering washers to a row of pins, a finger at each side of the middle finger for delivering washers to rows of pins at the sides of the row of pins to which the middle finger places washers, springs for drawing the side fingers toward the middle finger, a device for moving the side fingers to adjusted positions away from the middle finger, and means for delivering washers to said fingers.

52. A machine of the character described, comprising a middle finger for delivering washers to a row of pins, a finger at each side of the middle finger for delivering washers to rows of pins at the sides of the row of pins to which the middle finger places washers, springs for moving said side fingers toward said middle finger, mechanism for controlling the spaced relationship of said fingers, mechanism for delivering washers to said fingers in any position of said fingers, and means controlling the withdrawal of washers from said fingers.

53. A machine of the character described, comprising a middle finger for delivering washers to a row of pins, a finger at each side of the middle finger for delivering washers to rows of pins at the sides of the row of pins to which the middle finger delivers washers, means for actuating the side fingers toward the middle finger, a plate for moving the side fingers to adjusted positions away from the middle finger, and a pin-in-slot connection between said plate and the middle finger.

54. A machine of the character described, comprising a middle finger for delivering washers to a row of pins, a laterally movable finger at each side of the middle finger for delivering washers to rows of pins at the sides of the row of pins to which the middle finger delivers washers, and actuators for the side fingers actuating them to predetermined adjustments relative to the middle finger.

55. A machine of the character described, comprising a middle finger for delivering washers to a row of pins, a finger at each side of the middle finger for delivering washers to zigzag rows of pins at the sides of the row of pins to which the middle finger delivers washers, supports for the side fingers permitting said side fingers to oscillate to deliver washers to the pins in zigzag rows, and means for limiting movement of each of the side fingers in one direction.

56. A machine of the character described, comprising a pivoted middle finger for delivering washers to a row of pins, a finger pivoted at each side of the middle finger for delivering washers to zigzag rows of pins at the sides of the row of pins to which the middle finger delivers washers, and means for moving the side fingers to and holding the side fingers in different spaced relationship relative to the middle finger.

57. A machine of the character described, comprising a pivoted middle finger for delivering washers to a row of pins, a finger pivoted at each side of the middle finger for delivering washers to zigzag rows of pins at the sides of the row of pins to which the middle finger delivers washers, means for moving the side fingers to and holding the side fingers in different spaced relationship relative to the middle finger, means for delivering washers to said fingers, and springs holding the washers in the fingers and permitting withdrawal of the washers from the fingers.

58. A machine of the character described, comprising a series of pivoted middle fingers having passages for conducting washers to position for engagement by pins in rows to which the washers are to be applied, a finger at each side of each of the middle fingers for delivering washers to rows of pins at the sides of the rows of pins to which the middle fingers deliver washers, springs for moving the side fingers toward the middle fingers of the respective series, and mechanism for adjusting and holding said fingers in different relative adjustments to deliver washers to rows of pins different spaces apart.

59. A machine of the character described, comprising series of fingers having passages for conducting washers to positions for engagement by pins to which the washers are to be applied, each series comprising a middle finger for delivering washers to a row of pins, a finger at each side of the middle finger for delivering washers to rows of pins at the sides of the pins to which the middle finger delivers washers, and springs for actuating the side fingers toward the middle fingers; and means for delivering washers to each series of fingers.

60. A machine of the character described, comprising series of fingers having passages for conducting washers to positions for engagement by pins to which the washers are to be applied, each series comprising a middle finger for delivering washers to a row of pins, and a finger at each side of the middle finger for delivering washers to rows of pins at the sides of the pins to which the middle finger delivers washers; means for delivering washers to each series of fingers; means for moving the series of fingers to and holding the series of fingers in different spaced relationship; and means for delivering washers to each series of fingers in any position thereof.

61. A machine of the character described, comprising series of pivoted fingers having passages for conducting washers to positions for engagement by pins to which the washers are to be applied, each series of fingers comprising a middle finger and a pair of side fingers one at each side of the middle finger, springs for moving the side fingers toward the middle fingers of the respective series, means for adjusting and holding the side fingers of each series in different spaced relationship relative to the middle finger, and means for delivering washers into the passages in said fingers.

62. A machine of the character described, comprising series of pivoted fingers having passages for conducting washers to positions for engagement by pins to which the washers are to be applied, each series of fingers comprising a middle finger and a pair of side fingers one at each side of the middle finger, means for adjusting and holding the side fingers of each series in different spaced relationship relative to the middle finger, means for adjusting and holding the series of fingers in different spaced relationship, and means for delivering washers into the passages in said fingers in any of the adjustments of said fingers.

JULIUS H. KINTZELE.